United States Patent Office 2,914,508
Patented Nov. 24, 1959

2,914,508
AMINOPLASTS

Byron L. Williams, Jr., Texas City, Tex., and Harry M. Culbertson, North Wilbraham, Mass., assignors to Monsanto Chemical Company, St. Louis, Mo., a corporation of Delaware No Drawing. Application September 11, 1956
Serial No. 609,076

9 Claims. (Cl. 260—67.6)

This invention relates to new aminoplast resins which are particularly suitable for use in surface coating compositions. More particularly, the invention relates to etherified cyclohexylmelamine-aldehyde resins.

Etherified melamine-formaldehyde resins have found application in the surface coating field, particularly for use in combination with other film-forming materials. Coating compositions containing these etherified resins have the advantages of fairly rapid cure, good color retention, and chemical resistance. However, the known etherified melamine-formaldehyde resins, unless they are further modified, e.g. with aryl sulfonamides, have limited compatibility with other film-forming materials and impair the gloss of the final coating when used in sufficient quantities to effect maximum improvement of other qualities of the composition.

One object of this invention is to provide new aminoplast resins.

Another object is to provide resins which are particularly suitable for use in surface coating compositions.

Another object is to provide resins which may be used in combination with other film-forming materials to form coating compositions of improved qualities.

A further object is to provide resins having unlimited compatibility with alkyd resins of all oil lengths.

These and other objects are attained by reacting a cyclohexylmelamine with an aldehyde and an alcohol.

The following examples are given in illustration of the invention. Parts mentioned are parts by weight.

Example I

A reaction vessel is charged with a mixture of 100 parts of cyclohexylmelamine, 194 parts of formalin (37% formaldehyde), 177 parts of butanol, and 103 parts of water. The pH of the mixture is adjusted to 8.5 with 5% aqueous sodium hydroxide, and the mixture is refluxed for 30 minutes at atmospheric pressure. The resulting clear solution is acidified to a pH of 5.8 with oxalic acid and the water removed by azeotropic distillation at atmospheric pressure. The methylol cyclohexylmelamine is etherified and resinified during the process of azeotropic distillation. The solution is then concentrated under a vacuum of about 100 mm. of mercury to a solids content of 65%. The product is a clear, colorless solution of butylated cyclohexylmelamine-formaldehyde resin in butanol. It can be applied to various surfaces to form hard, brittle films having a high gloss.

Example II

A reaction vessel is charged with a mixture of 100 parts of cyclohexylmelamine, 176 parts of formalin (37% formaldehyde), and 104 parts of water. The mixture is refluxed for 30 minutes at atmospheric pressure at a pH of 8 obtained with 5% aqueous sodium hydroxide. Then 161 parts of butanol are added, and the solution is acidified to a pH of 5.4 with oxalic acid. Water is removed by azeotropic distillation at atmospheric pressure. During the process of azeotropic distillation, the methylol cyclohexylmelamine is etherified and resinified. The solution is then concentrated under a vacuum of about 100 mm. of mercury. The product can be cast onto glass surfaces to yield a film.

Example III

A mixture of 100 parts of cyclohexylmelamine, 83 parts of 91% aqueous paraformaldehyde, 18 parts of water, and 160 parts of methanol is refluxed for 30 minutes at atmospheric pressure at a pH of 8.5 obtained with 5% aqueous sodium hydroxide. The resulting solution is acidified to a pH of 5.5 with oxalic acid and refluxed for one hour. Water is removed by a series of flash evaporations in which the wet distillate is replaced by dry methanol until the desired solids content is obtained. The product is a clear, colorless solution of methylated cyclohexylmelamine-formaldehyde resin in methanol.

The cyclohexylmelamines used in making the resins of this invention correspond to the general formula

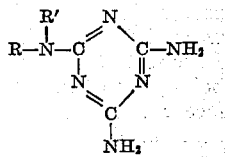

wherein R is a cyclohexyl group or a substituted cyclohexyl group bearing 1–5 aliphatic or alicyclic hydrocarbon substituents of 1–6 carbon atoms and R' is hydrogen, a cyclohexyl group, or a substituted cyclohexyl group bearing 1–5 aliphatic or alicyclic hydrocarbon substituents of 1–6 carbon atoms. Preferably, the total number of carbon atoms substituted on a cyclohexyl group is not more than 6. These compounds may be prepared by reacting 2,4-diamino-6-chloro-1,3,5-triazine with a cyclohexylamine or dicyclohexylamine bearing 0–5 aliphatic or alicyclic hydrocarbon substituents of 1–6 carbon atoms on the cyclohexyl nuclei. The reaction is carried out in the presence of water and a hydrogen chloride acceptor such as sodium hydroxide at a temperature of about 100° C. In making the resins, the cyclohexylmelamine may be incorporated into the reaction mixture as a dry powder or dissolved in the alcohol which is to be reacted with the alkylol cyclohexylmelamine. The cyclohexylmelamine of the example is one in which R' is hydrogen and R is cyclohexyl.

The aldehydes which are condensed with the cyclohexylmelamines are saturated or unsaturated aliphatic, alicyclic, or aromatic aldehydes. Suitable aldehydes for use in making the resins of this invention are formaldehyde, acetaldehyde, propionaldehyde, butyraldehyde, hexaldehyde, octaldehyde, benzaldehyde, furfural, acrolein, methacrolein, crotonaldehyde, cinnamaldehyde, etc. The lower aliphatic aldehydes, especially formaldehyde, are preferred. The ratio of aldehyde to cyclohexylmelamine in the reaction mixture may vary from about 3–7 moles of aldehyde per mole of cyclohexylmelamine. In the reaction, 3–5 moles of aldehyde combine with 1 mole of the cyclohexylmelamine, any excess over 5 moles being present to force the reaction to completion. When an excess amount of aldehyde is used, the unreacted aldehyde is removed by distillation when the reaction is completed.

Alcohols suitable for use in etherifying the alkylol cyclohexylmelamines are aliphatic and alicyclic alcohols containing 1–6 carbon atoms. The ratio of alcohol to cyclohexylmelamie in the reaction mixture may vary from about 3–10 moles of alcohol per mole of cyclohexylmelamine. The amount of alcohol employed in excess of that required to etherify the alkylol cyclohexylmelamines produced in the initial reaction serves as a solvent for the resinous product. The alcohol may be incorporated into the reaction mixture in the initial charge, or it may be added during the course of the reaction at any time prior to acidification of the mixture. It may be added together with the acid.

The reaction mixture is maintained at an alkaline pH, preferably 8–9, until formation of the alkylol cyclohexylmelamine is substantially completed. The mixture is then acidified to accomplish etherification and resinification of the condensate. Water is removed by conventional procedures, e.g., by azeotropic distillation or flash evaporation, and the solution is concentrated to the desired solids content by vacuum distillation or other suitable means. The solutions may be concentrated to obtain a product having a solids content as high as 95%. The reaction is usually carried out at reflux temperatures, but lower reaction temperatures may be used. The properties of the product may be varied by proper control of the reaction conditions. For example, if an essentially monomeric condensate is desired, the reaction mixture is cooled to a temperature below 30° C. before acidification and maintained at the lower temperature until completion of the reaction.

The products obtained by the processes of this invention are resinous solids or solutions of resin in the alcohol which was used for etherification. These products may be used per se or diluted with organic solvents such as higher boiling alcohols, hydrocarbons, organic esters, etc. Surface coatings may be formed from the resin solutions alone, or they may be modified by the incorporation of conventional additives such as natural or synthetic resins, dyes, pigments, fillers, etc. Curing of the resins may be accomplished by heating at temperatures of about 180°–400° F., for about 60–5 minutes.

The resins of this invention are useful in forming textile printing pastes, textile sizing compositions, and surface coatings for various surfaces such as wood, metal, paper, etc. They are particularly advantageous for use in modifying alkyd resins in surface coatings. They have unlimited compatibility with alkyd resins of all oil lengths, and coatings formed from mixtures of the new resins and alkyd resins are characterized by outstanding properties of hardness, chemical resistance, and high gloss.

The etherified cyclohexylmelamine-aldehyde resins of this invention may also be used in combination with other resinous materials, e.g., phenolic resins, other aminoplast resins, epoxy resins, etc.

It is obvious that many variations may be made in the products and processes set forth above without departing from the spirit and scope of this invention.

What is claimed is:

1. A process which comprises refluxing under alkaline conditions a mixture containing 1 molar proportion of a cyclohexylmelamine of the group consisting of monocyclohexylmelamine and N,N-dicyclohexylmelamine and 3–7 molar proportions of an aldehyde of the group consisting of an alkanol containing 1–8 carbon atoms, benzaldehyde, furfural, acrolein, methacrolein, crotonaldehyde, and cinnamaldehyde, reacting the product under acid conditions at temperatures up to and including reflux temperature with 3–10 molar proportions of a monohydric alkanol containing 1–6 carbon atoms, and finally removing excess aldehyde and alcohol.

2. A resin prepared by the process of claim 1.

3. A resin as in claim 2 wherein the cyclohexylmelamine is monocyclohexylmelamine.

4. A resin as in claim 2 wherein the alcohol is butanol.

5. A resin as in claim 2 wherein the aldehyde is formaldehyde.

6. A resin as in claim 3 wherein the alcohol is butanol and the aldehyde is formaldehyde.

7. A coating composition essentially comprising the resin of claim 2 dissolved in an organic solvent.

8. A process as in claim 1 wherein the reaction of the alcohol with the cyclohexylmelamine-aldehyde reaction product is carried out at reflux temperature.

9. A process as in claim 1 wherein the reaction of the alcohol with the cyclohexylmelamine-aldehyde reaction product is carried out at temperatures below 30° C.

References Cited in the file of this patent

UNITED STATES PATENTS

| | | |
|---|---|---|
| 2,197,357 | Widmer et al. | Apr. 16, 1940 |
| 2,361,823 | D'Alelio et al. | Oct. 31, 1944 |
| 2,781,553 | Varela et al. | Feb. 19, 1957 |

UNITED STATES PATENT OFFICE
CERTIFICATE OF CORRECTION

Patent No. 2,914,508 November 24, 1959

Byron L. Williams, Jr., et al.

It is hereby certified that error appears in the printed specification of the above numbered patent requiring correction and that the said Letters Patent should read as corrected below.

Column 4, line 14, for "alkanol" read -- alkanal --.

Signed and sealed this 7th day of June 1960.

(SEAL)
Attest:

KARL H. AXLINE
Attesting Officer

ROBERT C. WATSON
Commissioner of Patents